Feb. 11, 1964 G. SHAW ETAL 3,121,040
UNORIENTED POLYOLEFIN FILAMENTS
Filed Oct. 19, 1962 3 Sheets-Sheet 1
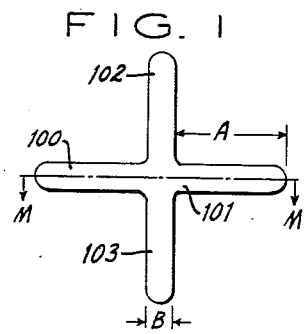
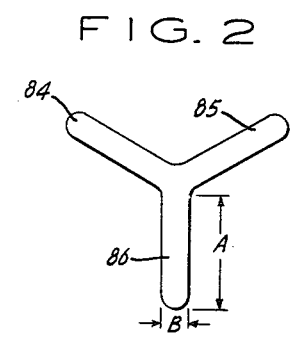
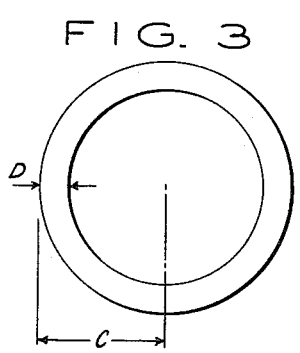
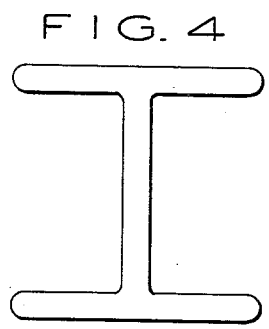
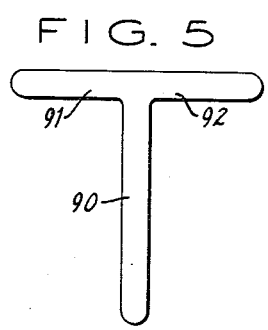
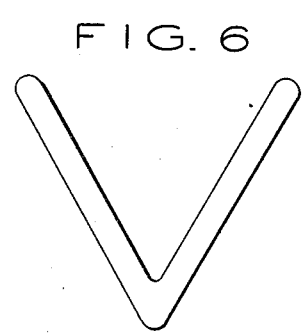
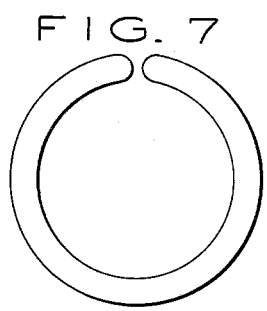
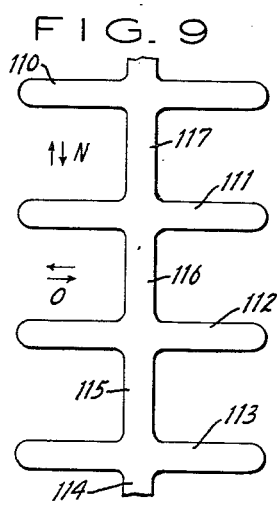
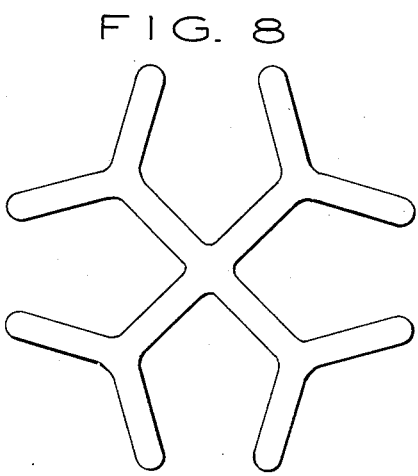
INVENTORS
GILBERT SHAW
JOHN C. LEWIS, JR.
BY
Morgan, Finnegan, Durham & Pine
ATTORNEYS Feb. 11, 1964 G. SHAW ETAL 3,121,040
UNORIENTED POLYOLEFIN FILAMENTS
Filed Oct. 19, 1962 3 Sheets-Sheet 2

INVENTORS
GILBERT SHAW
JOHN C. LEWIS, JR.
BY
Morgan, Finnegan, Durham & Pine
ATTORNEYS INVENTORS
GILBERT SHAW
JOHN C. LEWIS, JR.
BY
Morgan, Finnegan, Durham & Pine
ATTORNEYS United States Patent Office 3,121,040
Patented Feb. 11, 1964

3,121,040
UNORIENTED POLYOLEFIN FILAMENTS
Gilbert Shaw, % Polymers, Inc., Middlebury, Vt., and John C. Lewis, Jr., Middlebury, Vt.; said Lewis assignor to said Shaw
Filed Oct. 19, 1962, Ser. No. 231,779
17 Claims. (Cl. 161—177)

This invention relates to novel polyolefin filaments. It is particularly concerned with polyolefin filaments having greatly improved ability to resist deformation.

Polypropylene filaments as presently produced illustrate the tendency of certain polyolefins in filament form to suffer permanent deformation when subjected to deforming forces. Such permanent deformation is particularly noticeable when polypropylene filaments are used as brush fibers in many types of brushes. Forces set up by sweeping or cleaning action cause permanent deviation of individual fibers from the general parallel relationship of the family of fibers of which they are part whereby the brush construction is rendered increasingly unattractive of unsightly, wild fibers and eventually ineffective because of matting and interlocking of said permanently distorted, wild fibers.

The difference between these conventionally produced polypropylene fibers which fail to recover after deformation and the improved polypropylene fibers of this invention which show essentially complete recovery after deformation can be described in the following.

Normally, extruded thermoplastic monofilaments, polyolefins included, are subject to orienting or stretching procedures under controlled conditions with optional subsequent heat annealing in order to develop optimum properties. Again referring to brush fibers to which recovery after deformation is a most important criterion, polyamide filaments of the hexamethylene diamine-sebacic acid type, hereafter designated as 6–10 nylon filaments, produced in the manner described represent the finest synthetic brush fibers available to the brush industry from the stand-point of recovery after deformation.

However, other synthetic thermoplastic filaments are widely used as brush fibers even though inferior to 6–10 nylon filaments from the stand-point of recovery after deformation. Such inferior materials are usually selected because they cost less than 6–10 nylon filaments or because the service requirements of a given brush may not require the high quality performance of 6–10 nylon filaments.

Polypropylene represents one such low cost brush filament material which is used to a considerable extent even though its recovery after deformation as presently produced is markedly inferior to that of 6–10 nylon. However, in other respects such as abrasion, heat, and chemical resistance, polypropylene filaments are directly comparable performancewise to 6–10 nylon filaments and are markedly superior to 6–10 nylon filaments in maintaining their stiffness when exposed to wet or high humidity conditions. It is apparent therefore that, possessing the foregoing good properties, polypropylene would be a much more desirable filament material for use in brushes if process and shape improvements could be effected which resulted in endowing polypropylene filaments with recovery characteristics which are directly comparable to those of 6–10 nylon.

Objects and advantages of the invention will be set forth in part hereinafter and in part will be obvious herefrom, or may be learned by practice with the invention, the same being realized and attained by means of the steps, methods, compositions, combinations and improvements pointed out in the appended claims.

The invention consists in the novel steps, methods, compositions, combinations and improvements herein shown and described.

It is the object of this invention to provide polyolefin filaments which have good recovery after deformation characteristics. Another object of this invention is to provide novel filaments made from a composition selected from the group consisting of polypropylene, high pressure polyethylene and mixtures thereof which have recovery after deformation characteristics comparable to those of 6–10 nylon filaments.

Another object of this invention is to provide novel methods for producing filaments of the type described in the foregoing objects.

These objectives are attainable by using a specific non-conventional filament physical composition in conjunction with specific control of the filament shape. Neither the physical composition recommended nor the specific control of the filament shape effected is capable of bringing about the desired end when applied alone.

The composition change consists of producing the polyolefin filaments in unoriented rather than oriented form as is normal practice. This is a radical departure from customary filament producing techniques.

The shape control consists of producing the unoriented polyolefin filaments with cross-sections consisting of interconnected webs or annular walls whose web length to web thickness ratio or whose radius to annular wall thickness ratio is in the order of at least 4 to 1.

In the drawings:

FIGURES 1–9, inclusive, are end views of various unoriented polyolefin filaments formed in accordance with this invention, while FIGURES 10–13, inclusive, compare the recovery characteristics of filaments having the same general configuration but different web length to web thickness ratios.

In order to describe the invention more fully, specific reference will now be made to the drawings. FIGURES 1 to 9, inclusive, illustrate different embodiments of unoriented polyolefin filaments having cross-sections consisting of inter-connected webs or annular walls whose web length to web thickness ratio (FIGURES 1, 2, 4, 5, 6, 8 and 9) or whose radius to annular wall thickness ratio (FIG. 3 or FIG. 7) is in the order of at least 4 to 1. Thus, for example, in the embodiments of FIGS. 1 and 2, the web length A to web thickness B ratio, i.e., A/B is at least 4, while in FIGURE 3, the radius to annular wall thickness D, i.e., C/D is at least 4. Of course, the other embodiments illustrated in FIGS. 4 to 9 would likewise have an A/D or C/D ratio of at least 4. In like manner, filaments having a similar ratio but a configuration different from those illustrated in FIGS. 1–9, inclusive, are within the scope of the present invention.

Reference is now made to FIGURE 10, i.e., FIGURES 10A to 10F, inclusive, and FIGURE 11, i.e., FIGURES 11A to 11D, inclusive, of the drawings. These figures compare the recovery characteristics of two unoriented polypropylene filaments, each of which has an X-shaped cross-section of the type shown in FIG. 1. The filament of FIGURE 10, however, has a web length to web thickness ratio in the order of 3 to 1, which is below the ratio in accordance with the principles of this invention; while the filament 11 of FIGURE 11 has a web length to web thickness ratio in the order of 16 to 1 which is a ratio within the principles of this invention.

More particularly with respect to FIGURE 10:

FIG. 10A is a perspective view of an unoriented polyolefin monofilament 1 having an X-shaped cross-section and a web length to web thickness ratio of 3 to 1.

FIG. 10B illustrates the filament 1 being bent upon itself with the hands in the direction of 180° as indicated by the reference 2, the bend of the filament being designated by the reference numeral 3.

As shown in FIG. 10C, the filament 1 does not return to its original vertical disposition.

With respect to FIGURE 11:

FIGS. 11A to 11D, inclusive, illustrate bent unoriented polyolefin monofilament 11 having an X-shaped cross-section and a web length to web thickness ratio of 16 to 1.

Figure 10A:
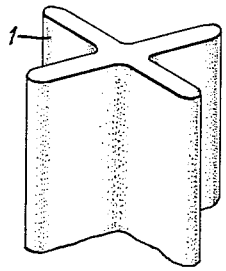
FIG. 10C is a multiple position illustration of the filament returning to its normal position from the bent position when one end 4 of the bent filament is released.
FIG. 10D is a front elevation and enlarged detail of the acutely bent portion of bend 3 of the filament 1 when bent as shown in FIG. 10B.
FIG. 10E is a side elevation of the acutely bent portion 3 of the filament when bent as shown in FIG. 10B.
FIG. 10F is a section taken at F—F of FIG. 10D.
Figure 10B:
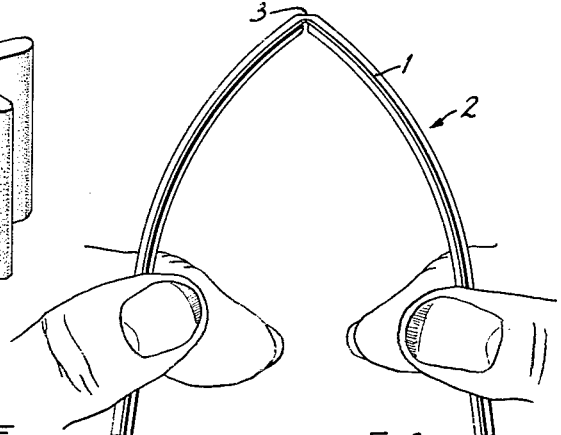
Figure 10C:
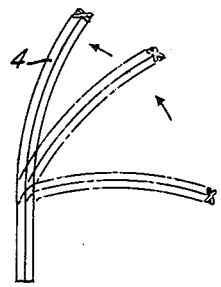
Figure 10E:
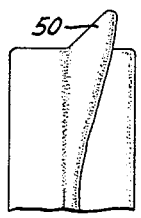
Figure 10D:
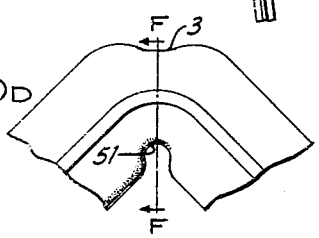
Figure 10F:
Figure 11C:
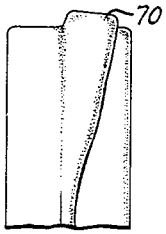
Figure 11A:
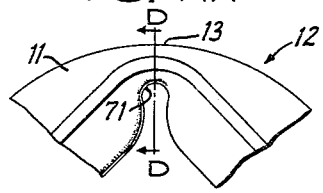

FIG. 11A is a front elevation of filament 11 being bent upon itself in the direction of 180° as indicated by the reference 12, the acutely bent portion or bend of the filament being designated by the reference numeral 13.

Figure 11D:
Figure 11B:
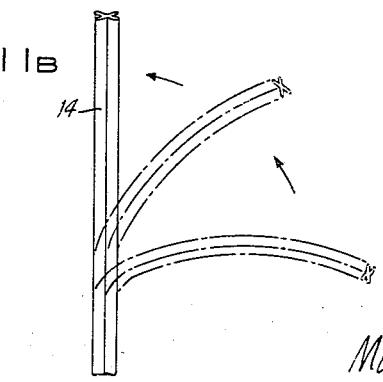

FIG. 11B is a multiple position illustration of the filament 11 returning to its normal position from a bent position when one end 14 of the bent filament is released. As shown in FIG. 11B, the filament returns to its original vertical disposition.

FIG. 11C is a side elevation of the acutely bent portion 13 of the filament 11.

FIG. 11D is a section taken at D—D of FIG. 11A.

FIGURE 12, i.e., FIGS. 12A to 12E, inclusive, and FIGURE 13, i.e., FIGS. 13A to 13D, inclusive, compare the recovery characteristics of two unoriented polypropylene filaments, each of which has a Y-shaped cross-section of the type shown in FIG. 2. The filament 21 of FIG. 12, however, has a web length to web thickness ratio in the order of 3.5 to 1, which is below the ratio in accordance with the principles of this invention; while the filament 31 of FIG. 13 has a web length to web thickness ratio in the order of 6:1 which is a ratio within the principles of this invention.

Figure 12A:
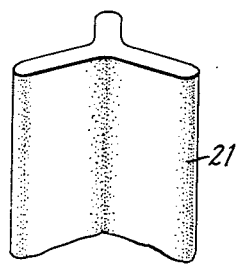

More particularly with respect to FIGURE 12:

FIG. 12A is a perspective view of an unoriented polyolefin monofilament 21 having a Y-shaped cross-section and a web length to web thickness ratio of 3.5 to 1.

Figure 12B:
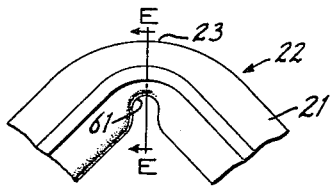

FIG. 12B is a front elevation of filament 21 being bent upon itself in the direction of 180° as indicated by the reference 22, the acutely bent portion or bend of the filament being designated by the reference numeral 23.

Figure 12C:
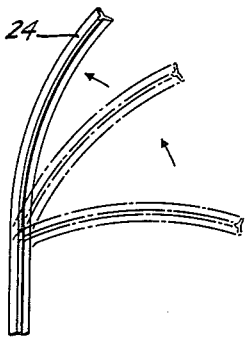

FIG. 12C is a multiple position illustration of the filament 21 returning to its normal position from a bent position, when one end 24 of the bent filament is released. As shown in FIG. 12C, the filament does not return to its normal vertical position.

Figure 12D:
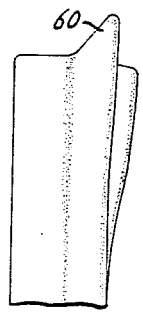

FIG. 12D is a side elevation of the acutely bent portion 23 of the filament.

Figure 12E:
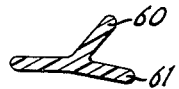

FIG. 12E is a section taken at E—E of FIG. 12B.

With respect to FIGURE 13:

FIGS. 13A to 13D, inclusive, illustrate a bent unoriented polyolefin monofilament having a Y-shaped cross-section and a web length to web-thickness ratio of 6 to 1.

Figure 13B:
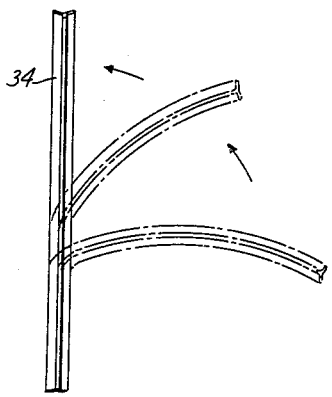
Figure 13A:
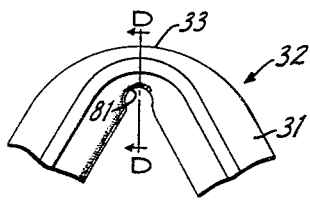

FIG. 13A is a front elevation of filament 31 being bent upon itself in the direction of 180° as indicated by the reference 32, the acutely bent portion or bend being designated by the reference numeral 33.

FIG. 13B is a multiple position illustration of the filament 31 returning to its normal position from a bent position when one end 34 of the bent filament is released. As shown in FIG. 13B, the filament returns to its original vertical disposition.

Figure 13C:
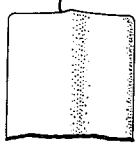

FIG. 13C is a side elevation of the acutely bent portion of the filament.

Figure 13D:
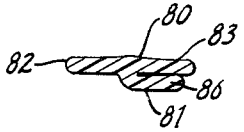

FIG. 13D is a section taken at D—D of FIG. 13A.

It has been established that the minimum web length to web thickness ratio for good recover after deformation varies according to the filament cross-section shape and the material used in the unoriented filaments. This consideration is illustrated further in the following tables. In the discussion which follows, reference will be made to filaments of the same general cross-sectional shape of the filaments shown in FIGURES 1 to 6, inclusive. In addition, Table 8 includes two examples of filaments having a solid circular cross-section.

TABLE I

*Recovery Characteristics of Unoriented Polypropylene Filaments Having Filament Shape as Shown in FIG. 1*

| A Web Length, Inches | B Web Thickness, Inches | Ratio, A/B | Recovery Rating after 180° Bend |
|---|---|---|---|
| 0.037 | 0.012 | 3/1 | Very poor. |
| 0.020 | 0.006 | 3.3/1 | Do. |
| 0.045 | 0.010 | 4.5/1 | Poor. |
| 0.100 | 0.020 | 5.0/1 | Do. |
| 0.026 | 0.008 | 7.7/1 | Fair. |
| 0.087 | 0.008 | 10.8/1 | Good. |
| 0.115 | 0.008 | 14.4/1 | Do. |
| 0.165 | 0.010 | 16.5/1 | Good to excellent. |

Thus, unoriented polypropylene filaments having cross-sectional shape as shown in FIGURE 1 start improving recovery-wise when the web length to web thickness ratio exceeds 5 to 1 and optimum recovery properties is attainable when the ratio exceeds 16 to 1.

Unoriented high pressure polyethylene filaments having cross-sectional shape as shown in FIGURE 1 do not require as high a web length to web thickness ratio to show good recovery characteristics. This point is illustrated in Table II.

TABLE II

*Recovery Characteristics of Unoriented High Pressure Polyethylene Filaments Having Cross-Section Shown in FIGURE 1*

| Web Length, inches | Web Thickness, inches | Ratio, A/B | Recovery Rating after 180° Bend |
|---|---|---|---|
| 0.020 | 0.007 | 3.0/1 | Fair. |
| 0.047 | 0.015 | 3.1/1 | Poor-fair. |
| 0.057 | 0.014 | 4.0/1 | Fair. |
| 0.056 | 0.013 | 4.3/1 | Do. |
| 0.070 | 0.006 | 11.6/1 | Excellent. |
| 0.045 | 0.003 | 15.0/1 | Do. |
| 0.125 | 0.006 | 21.0/1 | Do. |
| 0.117 | 0.003 | 39.0/1 | Do. |

Linear polyethylene does not seem to be of much value in unoriented form as shown in Table III.

TABLE III

*Recovery Characteristics of Unoriented Linear Polyethylene Filaments Having Cross-Section Shown in FIGURE 1*

| A Web Length, Inches | B Web Thickness, Inches | Ratio, A/B | Recovery Rating after 180° Bend |
|---|---|---|---|
| 0.050 | 0.014 | 3.5/1 | No good. |
| 0.019 | 0.005 | 3.8/1 | Do. |
| 0.057 | 0.011 | 5.2/1 | Do. |

As would be expected a 50–50 mixture of unoriented high pressure polyethylene and polypropylene requires a lower web length to web thickness ratio to show good recovery characteristics than does unoriented polypropylene alone. This is shown in Table IV.

TABLE IV

*Recovery Characteristics of 50–50 High Pressure Polyethylene-Polypropylene Unoriented Filaments With Shape as Shown in FIGURE 1*

| A Web Length, Inches | B Web Thickness, Inches | Ratio, A/B | Recovery Rating after 180° Bend |
|---|---|---|---|
| 0.039 | 0.013 | 3.0/1 | Poor. |
| 0.042 | 0.012 | 3.5/1 | Do. |
| 0.047 | 0.012 | 3.9/1 | Fair-Good. |

Unoriented polypropylene monofilaments having a cross-section as shown in FIGURE 2, require a lower web length to web thickness ratio for good recovery characteristics than do unoriented polypropylene monofilaments having a cross-section as shown in FIGURE 1. This is illustrated in Table V.

TABLE V

*Recovery Characteristics of Unoriented Polypropylene Filaments Having Cross-Section Shown in FIGURE 2*

| A Web Length, Inches | B Web Thickness, Inches | Ratio, A/B | Recovery Rating after 180° Bend |
|---|---|---|---|
| 0.032 | 0.012 | 2.6/1 | No good. |
| 0.070 | 0.020 | 3.5/1 | Do. |
| 0.060 | 0.017 | 4.0/1 | Poor. |
| 0.054 | 0.014 | 3.8/1 | Do. |
| 0.070 | 0.012 | 5.8/1 | Good. |
| 0.106 | 0.018 | 5.9/1 | Excellent. |
| 0.125 | 0.020 | 6.3/1 | Do. |

Recovery characteristics of hollow unoriented polypropylene monofilaments having an annular cross-section as shown in FIG. 3 are shown in Table VI.

TABLE VI

*Recovery of Hollow Unoriented Polypropylene Monofilaments Having Cross-Section as Shown in FIGURE 3*

| A Radius, inches | B Wall thickness, inches | Ratio, A/B | Recovery Rating after 180° Bend |
|---|---|---|---|
| 0.022 | 0.005 | 4.4/1 | Good-Excellent. |
| 0.024 | 0.003 | 8.0/1 | Excellent. |
| 0.027 | 0.003 | 9.0/1 | Do. |

Table VI is supplemented by Table VII which shows the recovery characteristics of a mixture of 80% polypropylene and 20% high pressure polyethylene in unoriented hollow filament form with cross-section also that of FIGURE 3.

TABLE VII

*Recovery Characteristics of a Mixture of 80% Polypropylene and 20% Polyethylene (High Pressure) in Filament Form with Cross-Section that of FIGURE 3*

| A Radius, inches | B Wall thickness, inches | Ratio, A/B | Recovery Rating after 180° Bend |
|---|---|---|---|
| 0.025 | 0.008 | 3.2/1 | Fair. |
| 0.020 | 0.006 | 3.4/1 | Fair-Good. |
| 0.023 | 0.005 | 4.6/1 | Good. |
| 0.034 | 0.006 | 5.6/1 | Excellent. |

Differing recovery characteristics for miscellaneous shapes of unoriented polypropylene are shown in Table VIII.

TABLE VIII

*Recovery Characteristics of Miscellaneous Cross-Sections Made Using Unoriented Polypropylene*

| Cross-Sectional Shape | A Web Length, inches | B Web Thickness, inches | Ratio, A/B | Recovery Rating after 180° Bend |
|---|---|---|---|---|
| Figure 5 | 0.075 | 0.010 | 7.5/1 | Poor. |
| Do | 0.130 | 0.010 | 13.0/1 | Fair-Good. |
| Figure 6 | 0.060 | 0.020 | 3.0/1 | Fair. |
| Do | 0.106 | 0.018 | 5.9/1 | Good. |
| Do | 0.125 | 0.020 | 6.3/1 | Good-Excellent. |
| Figure 4 | 0.055 | 0.013 | 4.2/1 | Do. |
| Solid: circular | Radius 0.027 | | | No good. |
| Do | 0.015 | | | Do. |

It has been shown that certain unoriented polyolefin filaments whose cross-section consists of interconnected webs show increasing tendency to recover from deformation as the ratio of the web lengths to their respective thickness increases. It has also been shown that shapes with annular walls show a similar, increasing tendency to recover after deformation as the ratio of the radius to the annular wall thickness increases.

This is not true for oriented polypropylene webbed shapes or for hollow oriented polypropylene shapes having annular walls.

For example, oriented polypropylene shapes similar to that shown in FIGURE 1 are absolutely no good from a recovery standpoint. In addition, the oriented webs split away from each other when the web length to web thickness ratio exceeds 3 to 1 and when the oriented filaments are bent through 180°. Web splitting and extremely poor recovery was also apparent in oriented filaments having shapes of the type shown in FIGURES 2 and 4 when they were made in oriented form with web length to web thickness ratios of 8 to 1 and 18 to 1, respectively. Web splitting and poor recovery also occurred when a 50–50 mixture of oriented high pressure polyethylene-polypropylene filaments having shapes shown in FIGS. 1, 2 and 4 and with web length to web thickness ratios of 5 to 1 were bent through 180°. Hollow oriented polypropylene having the shape shown in FIGURE 3 and a radius to wall thickness ratio of 18 to 1 split and failed to recover when bent through 180°.

It has been shown that unoriented filaments made from linear polyethylene having the shapes shown in FIGURE 1 have little value from a recovery standpoint. This is equally true of oriented linear polyethylene, webbed or annular shapes.

However, oriented high pressure polyethylene does, in oriented form, show improvement in recovery characteristics as the web length to web thickness ratio increases. Thus, such filaments in the shape shown in FIGURE 1 improve from Poor to Good-Excellent, to Excellent from a recovery standpoint as the web length to web thickness ratio increases from 2:1, to 4.5:1, to 7.9:1, respectively. Such oriented filaments have previously been covered in Shaw Patent No. 2,637,893, and are therefore not a concern of this invention which is concerned only with unoriented filaments.

On the basis of the experiments cited in Tables I to VIII, it can be said that only a few rare combinations of webbed or annular unoriented polyolefin filament shapes with web length to web thickness ratios or radius to annular wall thickness ratios of less than 4 to 1 show good recovery after deformation. However, a very large combination of unoriented polyolefin shapes with web length to thickness ratios and radius to annular wall thickness ratios greater than 4 to 1 show good recovery after deformation. Webbed unoriented polyolefin filaments with web lengths to thickness ratios or annular unoriented filaments with radius to annular wall thickness ratios greater than 4 to 1 are defined, therefore, as the products covered by this invention.

While this invention is not limited to any theory, it is thought desirable to give a possible explanation why certain unoriented polyolefin shapes with web length to web thickness ratios under 4 to 1 or annular unoriented polyolefin filaments with diameter to wall thickness ratios under 4 to 1 show poorer recovery than similar shapes whose corresponding ratios are greater than 4 to 1.

Reference is now made to FIGURES 10 to 13, inclusive.

When unoriented polyolefin filaments with ratios under 4 to 1 are bent as in FIGS. 10 and 12, the webs or walls do not collapse in sharp creases. In FIG. 10, molecules at 50 are subjected to considerably more stretching than those at 51 (see FIGURES 10D to 10F, inclusive), because of the larger bending radius at 50. Orientation occurs at 50 and the filaments are then permanently deformed. Similarly, in FIG. 12, molecules at 60 are stretched considerably more than the molecules at 61 with resultant permanent deformation (see FIGS. 12B, 12D and 12E).

When the ratios of length to width exceed 4 to 1 as in FIGURES 11 and 13, the individual webs or walls fold into sharp creases in which the molecules with the largest bending radius are not subjected to much greater stretching or orienting than those with the minimum bending radius. The location of such molecules with maximum and minimum bending radii are shown at 70 and 71, respectively, in FIGS. 11A, 11C and 11D, and 80 and 81 in FIGS. 13A, 13C and 13D.

The foregoing does not explain why unoriented polyolefin filaments with ratios in excess of 4 to 1 snap back to the position assumed prior to deformation when the deforming force is released. Fast snap-back occurs because energy is stored in the high ratio web creases in much the same manner that energy is stored in springs. For example, webs 82 and 83 in FIG. 13D want to return to the relative positions of webs 84 and 85 in FIGURE 2, or to their position before deformation. Web 86 in FIG. 13D wants to return to the relative position of web 86 to webs 84 to 85 shown in FIGURE 2. No matter how complex the shape is, the individual creased webs react in the direction of returning the filament cross-section to its original profile.

Confirmation that greater than 4 to 1 ratio unoriented polyolefin filaments return to their original shape in this manner is obtained by bending the filament of FIGURE 5 through 180° to deform web 90 and obtain a cross-section at the bend generally similar to the cross-section shown in FIG. 13D. When, after complete bending, web 90 and its spring-like action is cut off at the bend, webs 91 and 92 (FIGURE 5) show very poor recovery by themselves.

It is possible to create high recovery unoriented polyolefin filaments which show a high degree of unidirectional deformation and recovery when subjected to discontinuous external stress. If, for example, webs 100, 101, 102 and 103 of FIGURE 1 all have ratios over 4 to 1 but webs 100 and 101 have thicknesses several times those of webs 102 and 103, the shape will preferentially bend on a line indicated by M—M of FIG. 1. Similarly, if the interconnectetd web shape of FIGURE 9 has webs with ratios greater than 4 to 1 but webs 110, 111, 112 and 113 are several times thicker than webs 114, 115, 116 and 117, the interconnected shape will preferentially deform and recover in the directions shown at N rather than those shown at O as shown in FIGURE 9.

It is seen, therefore, that by varying the thickness of the individual webs with respect to each other, one obtains filaments having high unidirectional recovery. Other unique effects may be obtained by varying the thickness or configuration of an individual web or webs so long as the web length to maximum web thickness is maintained at a ratio of at least 4 to 1 in accordance with the principles of this invention.

All extruded sections contain strains. Since polyolefins are extruded directly into water any strains present in the webbed or annular shapes discussed are introduced at the temperature at which the polyolefin shapes emerge from the extrusion dies. These strains should not be construed as a degree of orientation. They may be greatly relieved by annealing at elevated temperatures and many of the webbed or annular extruded shapes discussed herein were annealed at 300° F. in the case of polypropylene and 212° F. in the case of high pressure polyethylene. Such annealing had the added advantage of giving completely straight filaments.

The shapes shown in the various figures are illustrated in their idealized form. In practice, the junction of a number of webs tends to be slightly thicker than the webs illustrated in the drawings. In addition, the webs usually taper slightly in the direction of their extremities. All web thicknesses, lengths, radius and annular wall thicknesses are determined by direct micrometer measurement.

The unoriented filaments of this invention may have an over-all cross-sectional dimension up to one inch. A preferred filament size is that wherein the over-all cross-sectional dimension is in the range of 0.010 to 0.400 inch.

It should be appreciated that while the terms unoriented polypropylene, unoriented high pressure polyethylene, etc. are used throughout for purposes of description, the filaments in practice may contain varying amounts of colorants, extenders, plasticizers, etc. which may be required for compounding practice dictates.

It should be understood that the terms "polypropylene" and "high pressure polyethylene," as used herein, cover equivalent polyolefin filaments, whether formed from polymers or copolymers, capable of exhibiting high recovery characteristics when produced in accordance with the principles of this invention.

The invention in its broader aspects is not limited to the specific steps, methods, compositions, combinations and improvements described but departures may be made therefrom within the scope of the accompanying claims without departing from the principles of the invention and without sacrificing its chief advantages.

What is claimed is:

1. Unoriented polyolefin filaments made from a composition selected from the group consisting of polypropylene, high pressure polyethylene and mixtures thereof, said unoriented filaments being selected from the group consisting of unoriented filaments whose cross-section consists of interconnected webs whose web length to web thickness ratios are at least about 4 to 1 and unoriented annular polyolefin filaments whose radius to annular wall thickness ratio is at least about 4 to 1.

2. Unoriented polyolefin filaments according to claim 1 wherein the material of the filaments is polypropylene.

3. Unoriented polyolefin filaments according to claim 1 wherein the material of the filaments is high pressure polyethylene.

4. Unoriented polyolefin filaments according to claim 1 wherein the material of the filaments is a mixture of high pressure polyethylene and polypropylene.

5. Unoriented polyolefin filaments according to claim 1 which have been annealed at elevated temperatures to relieve extrusion strains and give a straightened product.

6. Unoriented polyolefin filaments according to claim 1 wherein the filaments have an overall cross-section dimension in the range of 0.010 to 0.400 inch.

7. Unoriented polyolefin filaments made from a composition selected from the group consisting of polypropylene, high pressure polyethylene and mixtures thereof, whose cross-section consists of interconnected webs whose web length to web thickness ratios are at least about 4 to 1.

8. Unoriented polyolefin filaments according to claim 7 wherein the material of the filaments is polypropylene.

9. Unoriented polyolefin filaments according to claim 7 wherein the material of the filaments is high pressure polyethylene.

10. Unoriented polyolefin filaments according to claim 7 wherein the material of the filaments is a mixture of high pressure polyethylene and polypropylene.

11. Unoriented polyolefin filaments according to claim 7 wherein the filaments have been annealed at elevated temperatures to relieve extrusion strains and give a straightened product.

12. Unoriented polyolefin filaments according to claim 7 wherein some of whose webs have higher web length to thickness ratios than the others so that the interconnected webs shown unidirectional deformation when subjected to external stress.

13. Unoriented annular polyolefin filaments made from a composition selected from the group consisting of polypropylene, high pressure polyethylene and mixtures thereof, said unoriented filaments being annular filaments whose radius to annular wall thickness ratio is at least about 4 to 1.

14. Unoriented annular polyolefin filaments according to claim 13 wherein the material of the filaments is polypropylene.

15. Unoriented annular polyolefin filaments according to claim 13 wherein the material of the filaments is high pressure polyethylene.

16. Unoriented annular polyolefin filaments according to claim 13 wherein the material of the filaments is a mixture of high pressure polyethylene and polypropylene.

17. Unoriented annular polyolefin filaments according to claim 13 wherein the filaments have been annealed at elevated temperatures to relieve extrusion strains and give a straightened product.

References Cited in the file of this patent

UNITED STATES PATENTS

| | | |
|---|---|---|
| 2,637,893 | Shaw | May 12, 1953 |
| 2,939,201 | Holland | June 7, 1960 |
| 2,945,739 | Lehmicke | July 19, 1960 |